US008355143B2

(12) United States Patent
Kikuchi

(10) Patent No.: US 8,355,143 B2
(45) Date of Patent: Jan. 15, 2013

(54) CONTINUOUS PAPER DUPLEX PRINTER AND PRINTING METHOD

(75) Inventor: Hiroyuki Kikuchi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 118 days.

(21) Appl. No.: 13/064,202

(22) Filed: Mar. 10, 2011

(65) Prior Publication Data

US 2011/0222089 A1 Sep. 15, 2011

(30) Foreign Application Priority Data

Mar. 12, 2010 (JP) ................................ 2010-055582
Oct. 29, 2010 (JP) ................................ 2010-244543

(51) Int. Cl.
*G06F 15/00* (2006.01)
*G06K 1/00* (2006.01)

(52) U.S. Cl. ....................................... 358/1.12; 358/1.1

(58) Field of Classification Search ........................ None
See application file for complete search history.

(56) References Cited

FOREIGN PATENT DOCUMENTS

| | | | |
|---|---|---|---|
| JP | 08002017 | A | 1/1996 |
| JP | 2000071560 | A | 3/2000 |
| JP | 3852148 | B | 9/2006 |
| JP | 2007172038 | A | 7/2007 |
| JP | 2009058623 | A | 3/2009 |
| JP | 4380363 | B | 10/2009 |
| JP | 2011018157 | A | 1/2011 |

OTHER PUBLICATIONS

Abstract of Japanese Patent Publication No. JP10-187399, published on Jul. 14, 1998.

Abstract of Japanese Patent Publication No. JP2005-242644, published on Sep. 8, 2005.

*Primary Examiner* — Thierry Pham

(74) *Attorney, Agent, or Firm* — Harness, Dickey & Pierce, P.L.C.

(57) ABSTRACT

In a continuous paper duplex printer, during duplex printing, a printer controller provides image data for odd-numbered and even numbered pages to front surface and back surface image processing apparatuses respectively, and a printing engine prints an image of an odd-numbered page on the front of continuous paper and parallelly forms an image of an even-numbered page different from an even-numbered page subsequent to the odd-numbered page on the back of the front of the continuous paper based on the image data processed by the processing apparatuses. In the continuous paper duplex printer, during single sided printing, the printer controller provides image data for odd-numbered and even numbered pages to the processing apparatuses, but when the image data is provided to one of the processing apparatuses, blank page image data or a blank page instruction is provided to another one of the processing apparatuses.

8 Claims, 6 Drawing Sheets

CONTINUOUS PAPER DUPLEX PRINTER AND PRINTING METHOD

CROSS-REFERENCE TO RELATED APPLICATIONS

The present application claims priority to and incorporates by reference the entire contents of Japanese Patent Application No. 2010-55582 filed in Japan on Mar. 12, 2010 and Japanese Patent Application No. 2010-244543 filed in Japan on Oct. 29, 2010.

BACKGROUND OF THE INVENTION

1. Field of the Invention

The present invention relates to a continuous paper duplex printer and a printing method. The present invention also relates to single sided printing performed by the continuous paper duplex printer for printing an image (front image) on a page at the front of continuous paper in parallel with the printing of an image (back image) on a page that is different from the page mentioned above and is at the back of the continuous paper.

2. Description of the Related Art

Already known is an image forming system in which a printer controller once receives a printing request from a host apparatus (computer), and then, a printer (image forming apparatus) connected to the printer controller via an interface (I/F) performs printing. Moreover, already known as a printer that employs continuous paper and that enables high-speed printing is a printer that can linearly change a paper feed speed in order to prevent damage to paper from abrupt stop of paper feed. The printer includes therein an I/F and an I/F controller for responding to a printer controller, a printing mechanism, an image processing apparatus that corrects image data transmitted from the printer controller so as to match the image forming characteristics of the printing mechanism, and a process controller that controls the printing mechanism.

Japanese Patent Application Laid-open No. H8-2017 (see FIG. 5 of the publication) discloses an example of a continuous paper printer (hereinafter, referred to as a Single Engine Duplex (SED) system continuous paper printer) that enables duplex printing to be parallelly performed. In the example, for enabling duplex printing by a single continuous paper printer, the front surface of paper having a width that is a half size of the physical width of an image transfer unit provided at a printing mechanism is printed using a half side of the image transfer unit. Subsequently, the paper is reversely fed via a paper feed path and then is printed using the other half side of the image transfer unit again. Japanese Patent Application Laid-open No. H8-2017 also discloses a continuous paper printer (see FIG. 10 of the publication) in which two printing mechanisms are arranged in a tandem (serial) manner. In the continuous paper printer, the first printing mechanism forms an image on the front surface of continuous paper, and after the continuous paper is reversed, the second printing mechanism forms an image on the back surface of the paper as well. Thus, the second printing mechanism performs the image formation on the back surface in parallel with the image formation on the front surface performed by the first printing mechanism. Both of the printers have time difference between the formation of a front surface image and the formation of a back surface image for forming an image on the back of the front surface image. In other words, an image (front image) is printed on a page at the front of continuous paper while a back image that needs to be formed on the back surface of a page different from the page mentioned above is formed at the back of the continuous paper in parallel. Accordingly, time difference occurs between image formation of one of the page frames on the front surface of the continuous paper that corresponds to a sheet of cut paper and the image formation on the back surface of the front surface.

FIG. 6 is a schematic of an SED system continuous paper printer. Continuous paper 1 passes through an area that is at the left half of a recording drum 3 of an image forming mechanism 2 whose image forming area is two or more times larger than the width of the continuous paper 1 and that is at the left half of a roller 4. For duplex printing, the image forming mechanism 2 forms an image on the front surface of the continuous paper 1. Subsequently, the continuous paper 1 passes around a reverse roller 5 and return rollers 6 and 7 and then passes through an area that is at the right half of the recording drum 3 of the image forming mechanism 2 and that is at the right half of the roller 4 in a reversed state. The image forming mechanism 2 forms an image on the back surface of the continuous paper 1 that is reversed to serve as the front surface.

An image data processing system in the conventional SED system continuous paper printer starting from the printer controller includes three of a front surface image processing apparatus, a back surface image processing apparatus, and an image process controller. The front surface image processing apparatus and the back surface image processing apparatus perform image processing for pages to be printed. The image process controller (an I/F controller and a process controller) notifies the state of the printer and performs synchronization control of, front surface image processing and back surface image processing.

FIG. 7 is a timing chart for illustrating data transmission from a printer controller 21 to a front surface image processing apparatus 27 and a back surface image processing apparatus 28 in the conventional SED system continuous paper duplex printer during single sided print job processing. For the conventional single sided printing, the printer controller 21 transmits print image data (image data) produced according to the print job to the front surface image processing apparatus 27 and transmits a blank page instruction for the back surface of a sheet to the back surface image processing apparatus 28. Every time the transmission of the image data or the blank page instruction to the front surface image processing apparatus 27 or to the back surface image processing apparatus 28 is completed, a completion notice of page data transmission is provided to an image process controller (an I/F controller 25 and a process controller). The front surface image processing apparatus 27 performs image processing on the received image data and then provides a notice of a page data printable state to the process controller (not illustrated). In contrast, the back surface image processing apparatus 28 receives the blank page instruction from the printer controller 21, thus does not need to perform image processing, and therefore, provides the notice of a page data printable state to the process controller, upon receipt of the instruction. The process controller waits until the notices of a page data printable state are received from both the front surface image processing apparatus 27 and the back surface image processing apparatus 28. Subsequently, the process controller provides a paper feed instruction to a printing mechanism and also instructs the front surface image processing apparatus 27 and the back surface image processing apparatus 28 to transmit the image data to the printing mechanism.

In such a manner, during the printing of the single sided print job that is performed by the conventional SED continuous paper printer, the printer controller 21 makes only the front surface image processing apparatus 27 perform image processing of a printing image and transmits a blank page command to the back surface image processing apparatus 28. Therefore, during the printing of the single sided print job, processing is focused on the front surface image processing apparatus 27, and the back surface image processing apparatus 28 performs no processing. Thus, resources cannot be efficiently utilized.

Japanese Patent No. 3852148 discloses a method of controlling duplex printing for continuous paper that enables efficient printing even when a drum for a front surface is distanced from a drum for a back surface. In the method, in order to make a continuous paper printer efficiently perform duplex printing, a control device includes therein a front surface queue and a back surface queue (memories) per page, and when no image is printed on the back surface of paper, no operation (NOP) data is put in the queue. However, this method cannot improve productivity during single sided printing.

Japanese Patent Application Laid-open No. 2009-58623 discloses a system in which when two printers perform printing on cut paper, the first printer prints odd-numbered pages, and the second printer prints even-numbered pages in order to equalize toner consumption. However, even the technique of Japanese Patent Application Laid-open No. 2009-58623 cannot improve productivity during single sided printing.

SUMMARY OF THE INVENTION

It is an object of the present invention to at least partially solve the problems in the conventional technology.

According to an aspect of the present invention, there is provided a continuous paper duplex printer including: a front surface image processing apparatus that performs image processing of image data for printing on a front surface of continuous paper; a back surface image processing apparatus that performs image processing of image data for printing on a back surface of the continuous paper; a printer controller that converts print data into image data per page, during duplex printing, transmits image data for an odd-numbered page to the front surface image processing apparatus, and transmits image data for an even-numbered page to the back surface image processing apparatus; and a printing engine that forms an image for an odd-numbered page on a front of the continuous paper and that forms an image for an even-numbered page different from an even-numbered page subsequent to the odd-numbered page being in printing on a back of the continuous paper in parallel with image formation of the image data for an odd-numbered page, based on the image data subjected to the image processing performed by the front surface image processing apparatus and the image data subjected to the image processing performed by the back surface image processing apparatus, wherein during single sided printing: when the printer controller transmits the image data for an odd-numbered page to the front surface image processing apparatus, the printer controller transmits blank page image data or a blank page instruction to the back surface image processing apparatus, and when the printer controller transmits the image data for an even-numbered page to the back surface image processing apparatus, the printer controller transmits blank page image data or a blank page instruction to the front surface image processing apparatus.

According to another aspect of the present invention, there is provided a printing method performed by a continuous paper duplex printer, the printing method including: performing image processing of image data for printing on a front surface of continuous paper by a front surface image processing apparatus; performing image processing of image data for printing on a back surface of the continuous paper by a back surface image processing apparatus; converting print data into image data per page, during duplex printing, transmitting image data for an odd-numbered page to the front surface image processing apparatus, and transmitting image data for an even-numbered page to the back surface image processing apparatus, by a printer controller; forming an image for an odd-numbered page on a front of the continuous paper and forming an image for an even-numbered page different from an even-numbered page subsequent to the odd-numbered page being in printing on a back of the continuous paper in parallel with image formation of the image data for an odd-numbered page by a printing engine based on the image data subjected to the image processing performed by the front surface image processing apparatus and the image data subjected to the image processing performed by the back surface image processing apparatus; and transmitting blank page image data or a blank page instruction to the back surface image processing apparatus by the printer controller when the printer controller transmits the image data for an odd-numbered page to the front surface image processing apparatus, and transmitting blank page image data or a blank page instruction to the front surface image processing apparatus by the printer controller when the printer controller transmits the image data for an even-numbered page to the back surface image processing apparatus, during single sided printing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a continuous paper duplex printer and a printing method according to the present invention are described below in detail with reference to the accompanying drawings.

In the embodiments, a printer controller notifies a process controller of a single sided print job, and parallelly transmits image data for odd-numbered pages to a front surface image processing apparatus and transmits image data for even-numbered pages to a back surface image processing apparatus so as to perform image processing in parallel with the notification. Thus, the total time required for image processing of all pages is shortened.

EMBODIMENTS

First Embodiment

Figure 1:
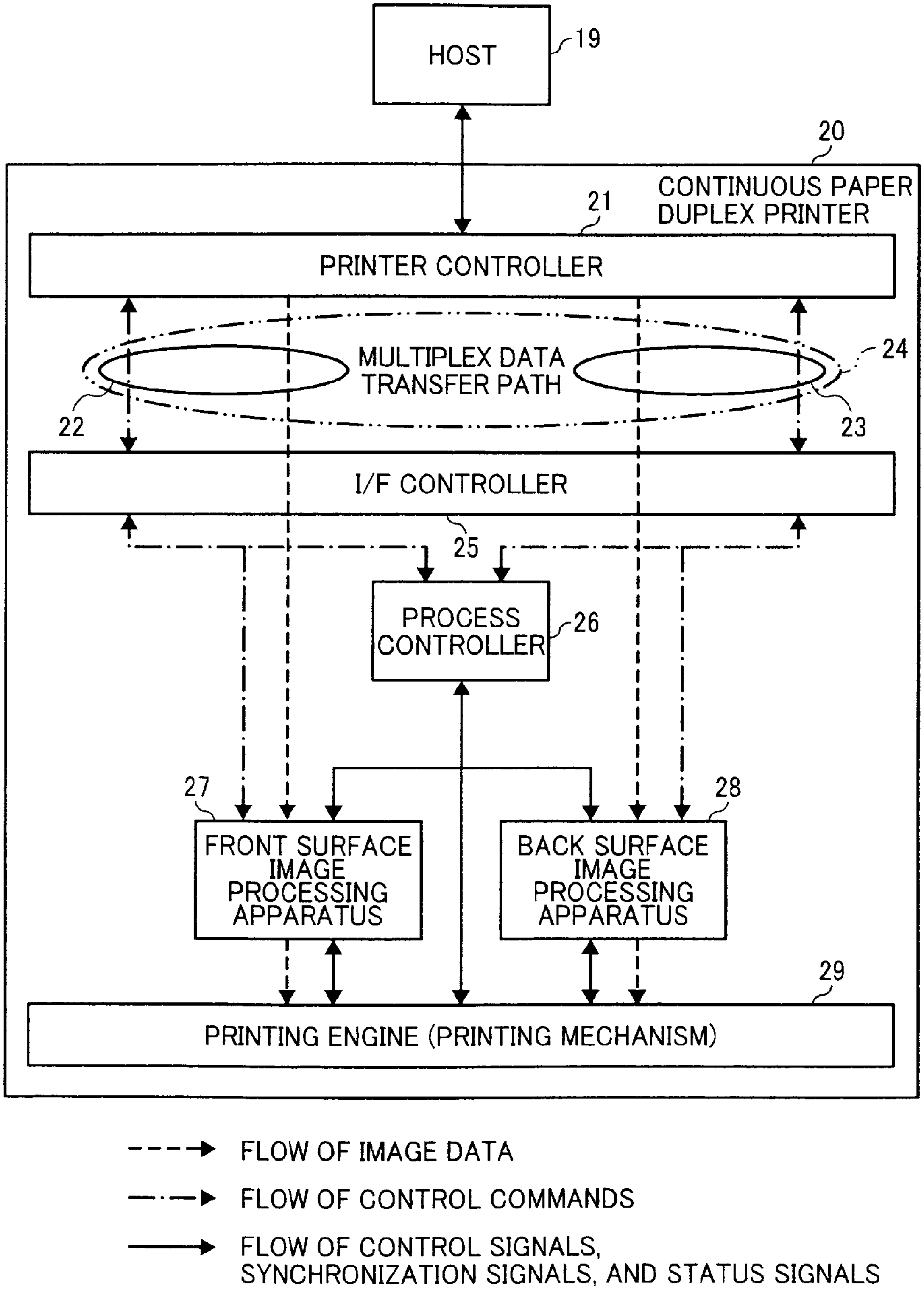
FIG. 1 is a block diagram of an image data processing system according to First Embodiment.

FIG. 1 is a schematic of an image forming system of a Single Engine Duplex (SED) system continuous paper duplex printer 20 according to First Embodiment. The mechanism of the SED system continuous paper duplex printer 20 of the present embodiment is similar to that of a conventional embodiment illustrated in FIG. 6. A printer controller 21 performs raster image processor (RIP) processing by which print data transmitted from a host (computer) is converted to print image data (image data) for each page. The printer controller 21 transmits, among the converted image data, the image data to be printed on the front surface of paper to a front surface image processing apparatus 27 and the image data to be printed on the back surface of the paper to a back surface image processing apparatus 28.

An image data transport path between the printer controller 21 and the front surface image processing apparatus 27 and the back surface image processing apparatus 28 is a multiplex data transfer path 24. The image data to the front surface image processing apparatus 27 can be transferred through an image data transport path 22 in the data transfer path 24 while the image data to the back surface image processing apparatus 28 can be transferred through an image data transport path 23 in the data transfer path 24 in parallel. This system enables high-speed data transfer. The data transfer path 24 may be a plurality of physical cables or be a logically isolated single cable. In the present embodiment, the data transfer path 24 is an optical cable based on PCI Express (PCIe).

The front surface image processing apparatus 27 and the back surface image processing apparatus 28 receive the image data and correct the data to image data that complies with the image expression characteristics of the printing mechanism of a printing engine 29. After the completion of the correction, the front surface image processing apparatus 27 and the back surface image processing apparatus 28 notify a process controller 26 of the completion of the processing. In response to the completion of the processing by the front surface image processing apparatus 27 and the back surface image processing apparatus 28, the process controller 26 provides an image data transmission instruction toward the printing mechanism of a printing engine 29 to the front surface image processing apparatus 27 and the back surface image processing apparatus 28. At the same time, the process controller 26 provides a paper feed instruction to the printing mechanism.

Figure 2:
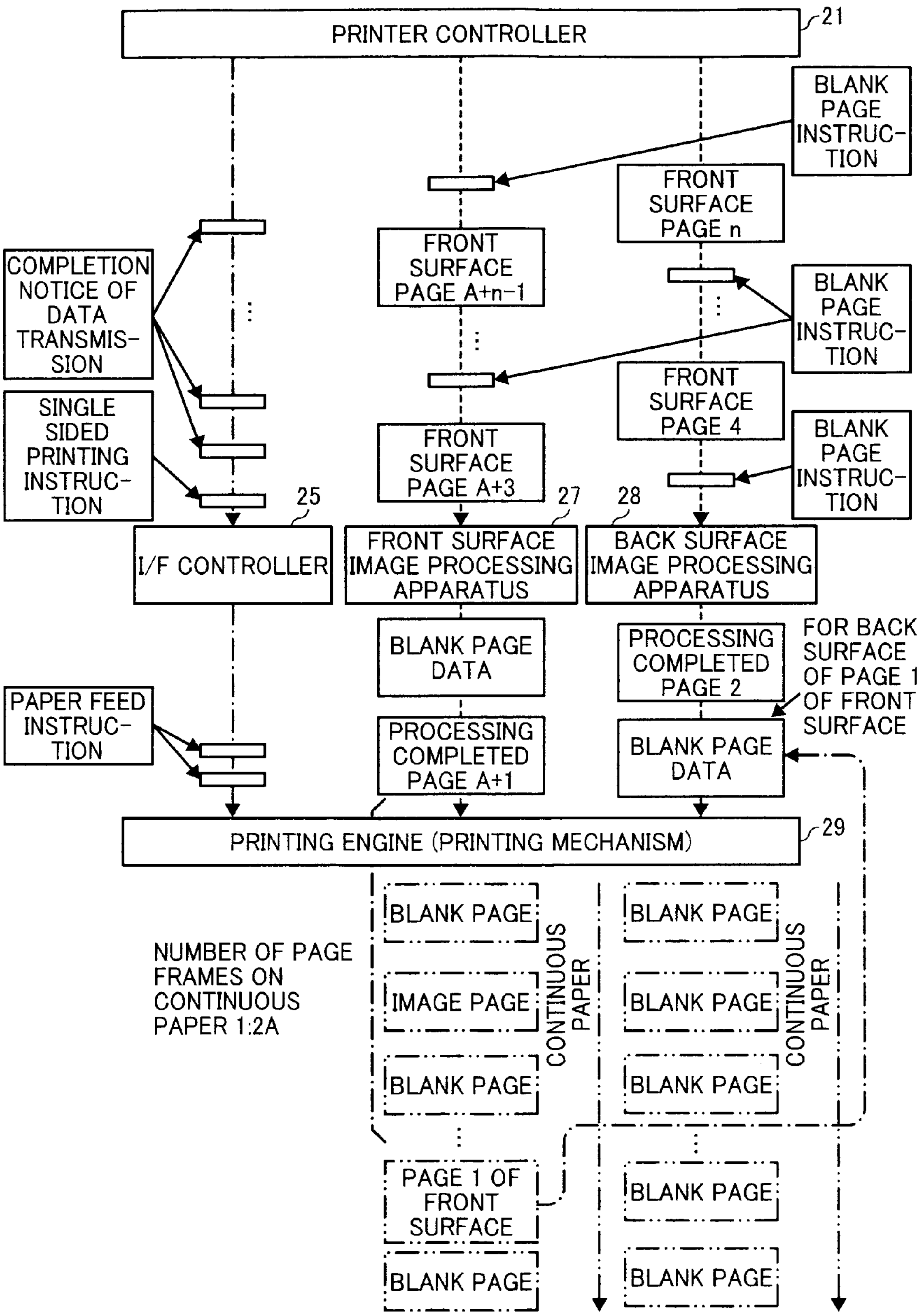
FIG. 2 is a block diagram of flows of an output order of image data for each page by a printer controller 21 and an image forming order by a printing engine according to First Embodiment.

FIG. 2 illustrates an image data transfer pattern in the image processing system illustrated in FIG. 1 from the printer controller 21 to the front surface image processing apparatus 27 and the back surface image processing apparatus 28 during single sided print job processing. In the single sided printing of the present embodiment, the printer controller 21 transmits image data (print image data) produced according to a print job provided by a host 19 to the front surface image processing apparatus 27 when the data is for odd-numbered pages and to the back surface image processing apparatus 28 when the data is for even-numbered pages. When the received image data is print image data, the front surface image processing apparatus 27 performs image processing for correcting the data to image data that complies with the image forming characteristics of the printing engine 29. When receiving a blank page instruction, the front surface image processing apparatus 27 provides a notice of a page data printable state to the process controller 26 without performing the processing. The back surface image processing apparatus 28 also performs similar processing. However, when receiving print image data in a single sided printing mode, the back surface image processing apparatus 28 additionally performs image data rotation, processing for rotating an image 180 degrees in order to align the direction of the back surface image with the direction of the front surface image.

The process controller 26 waits until the notices of a page data printable state are received from both the front surface image processing apparatus 27 and the back surface image processing apparatus 28, and then provides a paper feed instruction to the printing mechanism. In the process, the process controller 26 provides a paper feed instruction for feeding two sheets (two frames in pages), and thus instructs the printing mechanism so that the front surface image processing apparatus 27 and the back surface image processing apparatus 28 alternately print the image processing completed pages produced. This print image data transmission system enables two image processing apparatuses to perform image processing in parallel and shortens the time for the image processing to about a half.

Figure 3A:
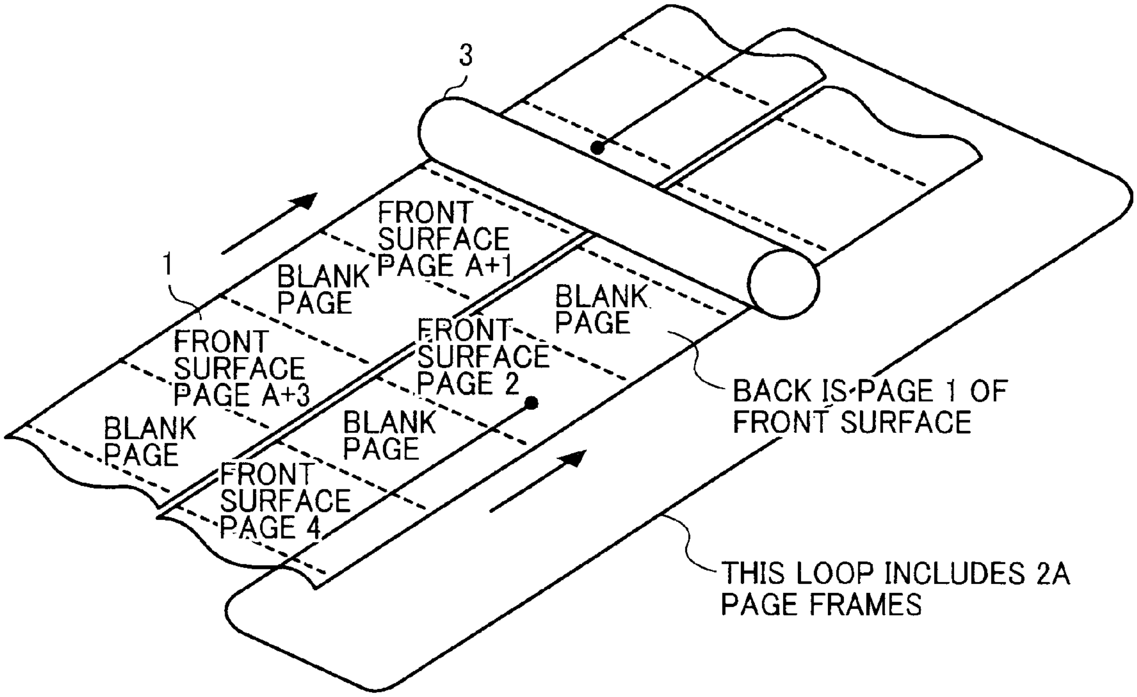
FIG. 3A is a perspective view of page frame segments indicated by dotted lines on continuous paper 1 that enters under a recording drum of a Single Engine Duplex (SED) system continuous paper duplex printer according to First Embodiment.
Figure 3B:
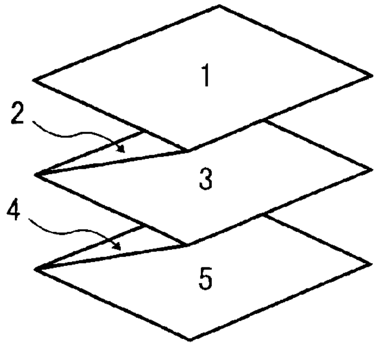
FIG. 3B is a perspective view illustrating page numbers on the continuous paper after image formation.

FIGS. 3A and 3B illustrate a printing order and a printed result during single sided print job processing of First Embodiment. As illustrated in FIG. 3A, in the single sided printing of the present embodiment, the front surface and the back surface of continuous paper 1 are alternately printed so that the front surface printing and the back surface printing are both performed on every other page. Therefore, as illustrated in FIG. 3B, when the continuous paper is folded, the printed surfaces are always advantageously in an upward direction.

In the present embodiment, a delay for 2A frames (2A sheets) is caused until the page to which front printing is performed is reversed and is returned to a recording drum 3. In other words, the continuity (FIG. 3B) between pages for page images is lost unless the printing for even-numbered pages subsequent to the printing for odd-numbered pages is performed after the odd-numbered pages are printed and 2A frames of the continuous paper are fed. Accordingly, in the single sided printing mode of the present embodiment, the printer controller 21 transmits image data for even-numbered pages after a delay from the image data transmission for odd-numbered pages until 2A frames of the continuous paper is fed.

2A frames are fed until the back surface of the sheet (frame) whose surface is printed with an image for the first page returns to the recording drum 3. During the process, images may be formed on every other page (frame) as indicated by blocks of a chain double-dashed line in FIG. 2. Accordingly, the process controller 26 performs the feeding of two frames of the continuous paper every image formation of one page while images are repeatedly formed from the first page (first frame) to the 2A frames. After 2A frames of the continuous paper is fed, odd-numbered page printing to the front surface of the continuous paper and even-numbered page printing to the back surface is alternately performed, and therefore, one frame of the continuous paper is fed every image formation of one page.

As described above, in the present embodiment, the printer controller 21 simply performs RIP processing on each page, and the front surface image processing apparatus 27 and the back surface image processing apparatus 28 operate alternately. Thus, the processing by the printer controller 21 works with the processing time of the front surface image processing apparatus 27 and the back surface image processing apparatus 28. Therefore, when the number of pages is large, the total time required for image processing of total pages performed by the SED system continuous paper duplex printer 20 can be shortened to about a half, and the productivity in the single sided print job performed by the SED system continuous paper duplex printer 20 can be improved.

Second Embodiment

In First Embodiment, in the printer operation, the printer controller 21 performs RIP processing on each page, and the front surface image processing apparatus 27 and the back surface image processing apparatus 28 operate alternately. However, in Second Embodiment, images already subjected to RIP processing are reprinted.

Figure 4:
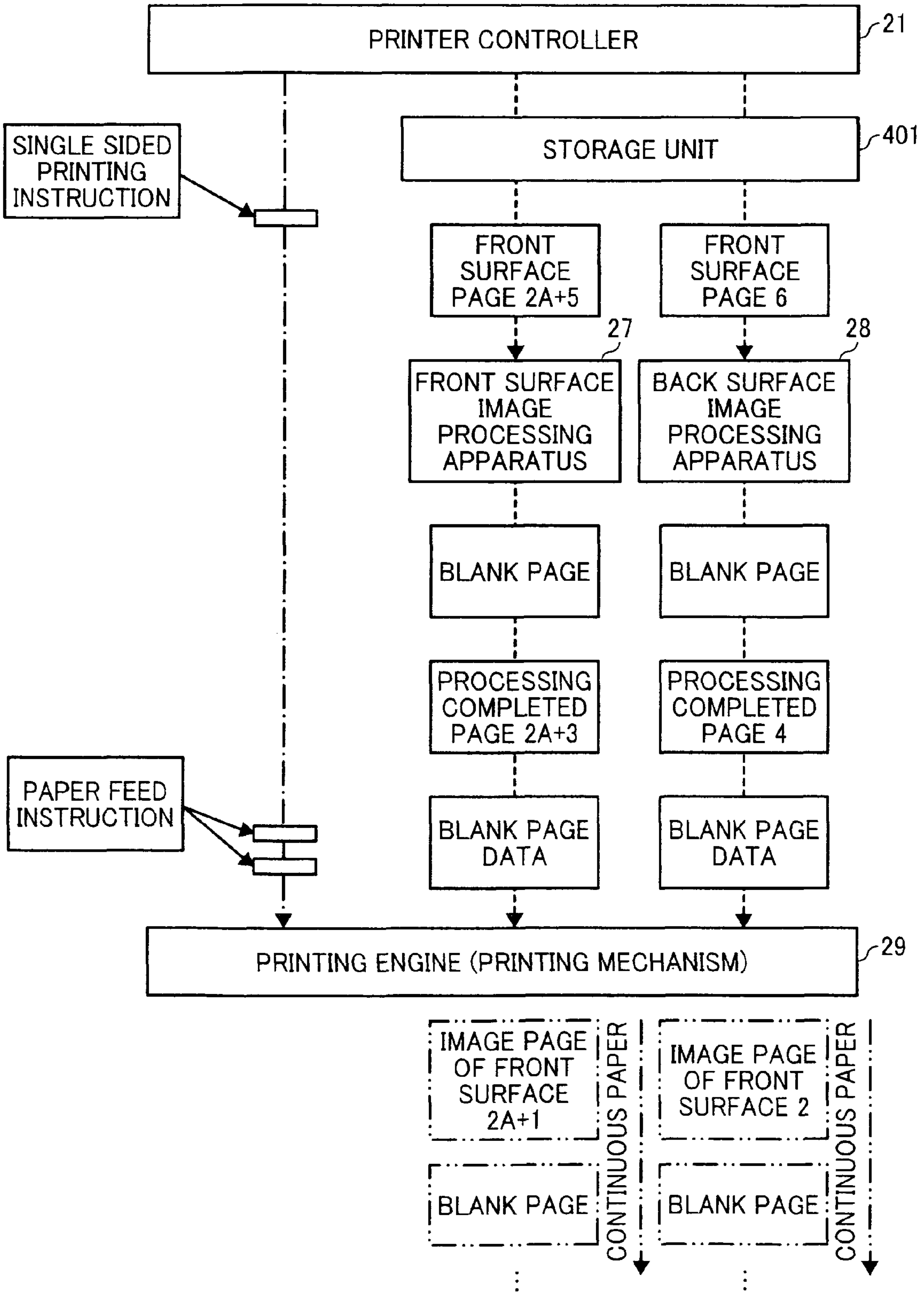
FIG. 4 is a block diagram of a flow of an image forming order by a printing engine of an SED system continuous paper duplex printer according to Second Embodiment.

FIG. 4 is a block diagram illustrating a flow of an image forming order by the printing engine of the SED system continuous paper duplex printer 20 according to Second Embodiment. The SED system continuous paper duplex printer 20 of the present embodiment is connected to the host 19 in a similar manner to First Embodiment and mainly includes the printer controller 21, the front surface image processing apparatus 27, the back surface image processing apparatus 28, the printing engine 29, and a storage unit 401.

The printer controller 21 receives print data from the host 19 and performs RIP processing in a manner similar to First Embodiment. In the present embodiment, immediately after the RIP processing, the printer controller 21 transmits image data after the RIP processing to the front surface image processing apparatus 27 and the back surface image processing apparatus 28 to perform printing processing in a manner similar to First Embodiment. Moreover, the printer controller 21 makes the storage unit 401 store therein the image data after the RIP processing.

The front surface image processing apparatus 27 and the back surface image processing apparatus 28 perform image processing on the image data transmitted from the printer controller 21 in a manner similar to First Embodiment. In the present embodiment, the front surface image processing apparatus 27 and the back surface image processing apparatus 28 perform image processing similar to First Embodiment also on the image data stored in the storage unit 401 when the printer controller 21 instructs reprinting.

Figure 5:
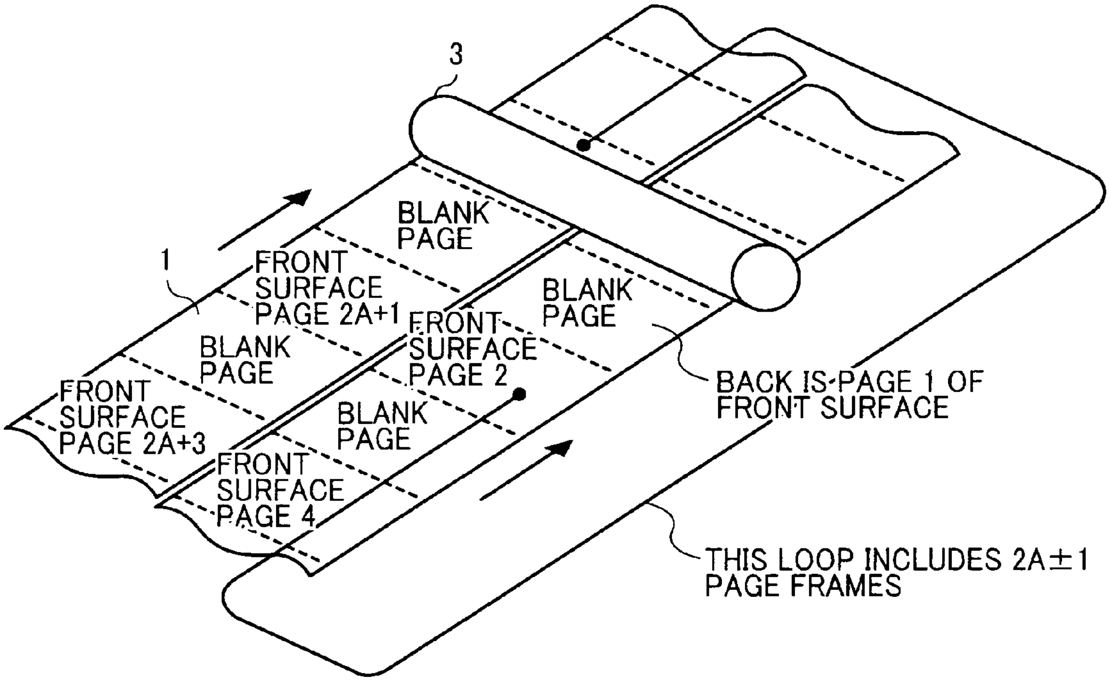
FIG. 5 is a perspective view of page frame segments indicated by dotted lines on continuous paper that enters under a recording drum of the SED system continuous paper duplex printer according to Second Embodiment.

FIG. 5 is a perspective view of page frame segments indicated by dotted lines on continuous paper 1 that enters under the recording drum 3 of the SED system continuous paper duplex printer 20 according to Second Embodiment.

In the present embodiment, as illustrated in FIGS. 4 and 5, when a single sided printing instruction is received while the image data stored in the storage unit 401 is reprinted, the front surface image processing apparatus 27 and the back surface image processing apparatus 28 operate at the same time (parallelly). Thus, the printing engine 29 prints the front surface and the back surface of the paper at the same time (parallelly). On both of the subsequent pages, the printing engine 29 performs blank paper printing. Subsequently, such printing is performed alternately.

In the present embodiment, when the image data stored in the storage unit 401 is reprinted, the feed path via which the page to which front printing is performed is reversed and is returned to the recording drum 3 has a paper path length corresponding to 2A+1 frames (2A+1 sheets). In such a manner, the front surface and the back surface can be printed at the same time.

Although FIGS. 4 and 5 illustrate examples when the feed path has a length corresponding to 2A+1 frames, the feed path may have a length corresponding to 2A−1 frames.

The present embodiment is applied during reprinting. However, the structure of the present embodiment can also be applied during normal printing by the following manner. A buffer section having a content of at least one page is provided to at least any one of the front surface image processing apparatus 27 and the back surface image processing apparatus 28, and the transmission timing from the image processing apparatus including the buffer section to the printing engine 29 is changed by the content of one page.

In the present embodiment, for normal printing similar to the printing of First Embodiment, the front surface image processing apparatus 27 and the back surface image processing apparatus 28 operate alternately to print each page alternately. Therefore, the paper path length of the feed path via which the page to which front printing is performed is reversed and is returned to the recording drum 3 requires a length corresponding to 2A frames as with First Embodiment. Thus, in the present embodiment, the paper path length of the feed path is switched between 2A frames and 2A+1 frames (or 2A−1 frames) for normal printing and for reprinting, respectively. Specifically, the paper path length can be structured to be physically switched. For the switching for the paper path length, for example, return rollers 6 and 7 are moved in a direction orthogonal to the shafts of the rollers so that the paper path is shortened (lengthened) by one page, or the head itself of an image engine section (for example, an inkjet printing apparatus) is parallelly moved relative to paper by a half page in a paper feed direction.

In such a manner, in the present embodiment, actual printing and totally blank paper printing are repeated on each page. Particularly, when the printing engine 29 is a single engine having a wide width, printing can be performed at once, which enables efficient printing.

The present embodiment describes an operation for reprinting print data recorded in the storage unit 401. The printer controller 21 receives a job, produces printing pages, and then once stores the pages in the printer controller. The printer controller 21 produces a few page data (preferably for all pages) in the job and then transmits print data to image processing apparatuses. In this operation, actual page data is not transmitted from the printer controller 21 illustrated in FIG. 4 to the front surface image processing apparatus 27 and the back surface image processing apparatus 28 during a blank page instruction, and therefore, odd-numbered pages and even-numbered pages can arrive at substantially the same time. Thus, image processing can be performed on the front surface and the back surface of paper at substantially the same time. Accordingly, transfer time can be shortened to a half, and even when a paper feed speed of a continuous paper duplex printer is doubled, printing (tracking) can be performed. In First Embodiment, the printer controller produces page data while receiving job data and transmits print data to the image processing apparatuses upon the compression of the production. When the time for producing page data takes longer than the time for transferring data through the data transfer path 24, data for odd-numbered pages and data for even-numbered pages cannot be transmitted at the same time, which can be solved by the method of the present embodiment to enable efficient printing.

Figure 6:
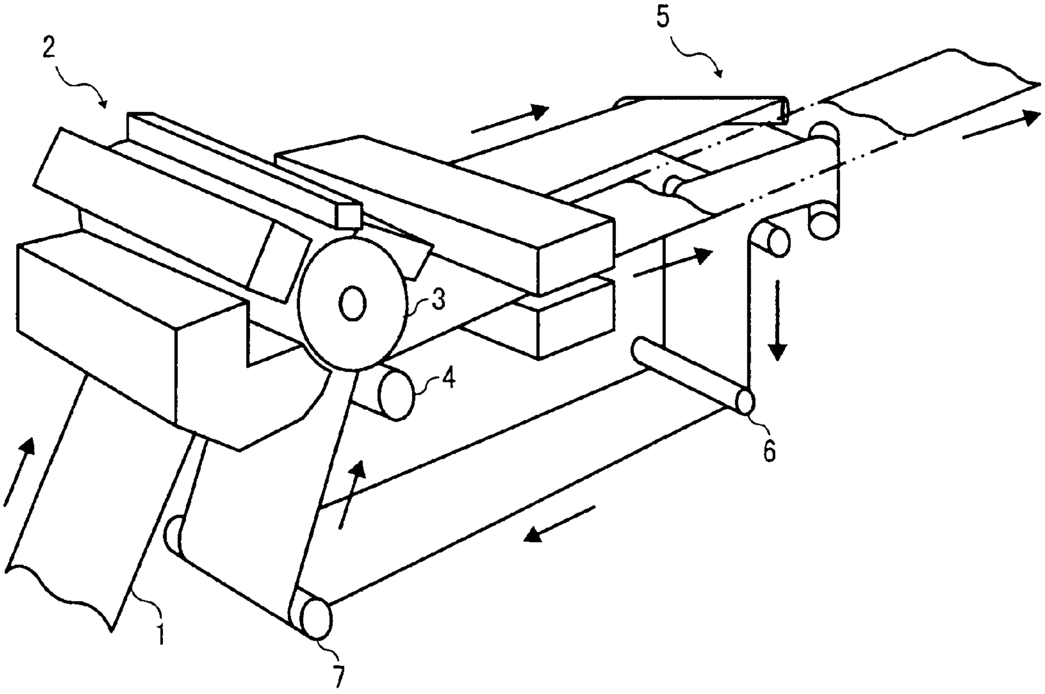
FIG. 6 is a perspective view illustrating the appearance of an SED system continuous paper duplex printer.
Figure 7:
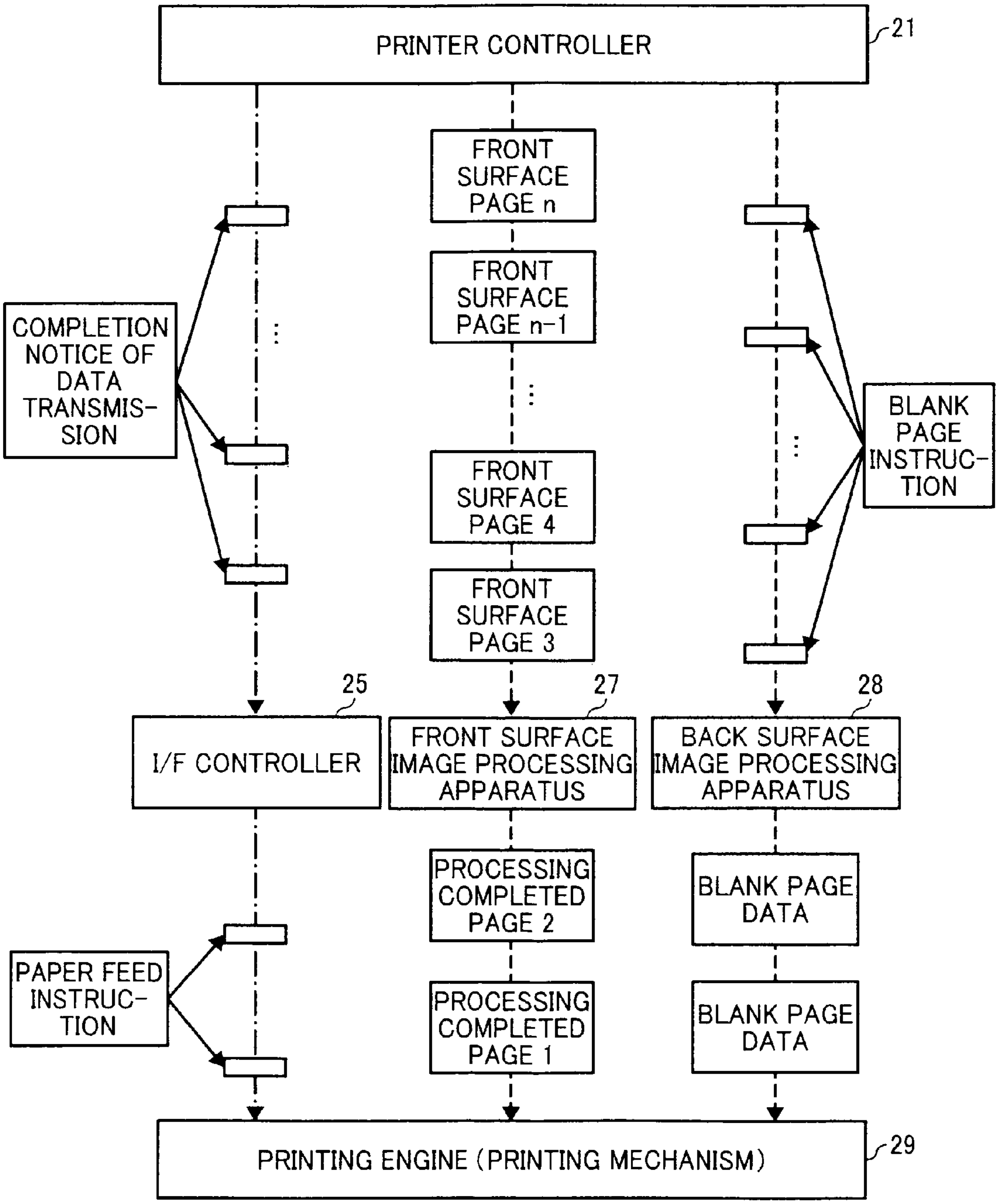
FIG. 7 is a block diagram of a flow of an output order of image data for each page by a printer controller of a conventional SED system continuous paper duplex printer during single sided printing.

For performing First Embodiment and Second Embodiment, the appearance structure of the SED system continuous paper duplex printer 20 is not limited to the embodiment illustrated in FIG. 6. An image forming mechanism 2 may be electrostatography (a laser printer), an inkjet printer, or other similar mechanisms capable of printing in a wide range. Two mechanisms may be arranged to perform printing in a wide range instead of one mechanism. Moreover, a mechanism may be used in which while the recording drum and the roller whose shafts are long are each used as a set having a wide width, two sets of image forming processing elements are arranged.

According to some aspects of the present invention, when the number of pages is large, the total time required for image processing of all pages that is performed by the image processing apparatuses can be shortened to about a half. Therefore, the productivity in a single sided print job performed by the continuous paper duplex printer can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A continuous paper duplex printer comprising:

a front surface image processing apparatus that performs image processing of image data for printing on a front surface of continuous paper;

a back surface image processing apparatus that performs image processing of image data for printing on a back surface of the continuous paper;

a printer controller that converts print data into image data per page, during duplex printing, transmits image data for an odd-numbered page to the front surface image processing apparatus, and transmits image data for an even-numbered page to the back surface image processing apparatus; and a printing engine that forms an image for an odd-numbered page on a front of the continuous paper and that forms an image for an even-numbered page different from an even-numbered page subsequent to the odd-numbered page being in printing on a back of the continuous paper in parallel with image formation of the image data for an odd-numbered page, based on the image data subjected to the image processing performed by the front surface image processing apparatus and the image data subjected to the image processing performed by the back surface image processing apparatus, wherein during single sided printing:

when the printer controller transmits the image data for an odd-numbered page to the front surface image processing apparatus, the printer controller transmits blank page image data or a blank page instruction to the back surface image processing apparatus, and when the printer controller transmits the image data for an even-numbered page to the back surface image processing apparatus, the printer controller transmits blank page image data or a blank page instruction to the front surface image processing apparatus.

2. The continuous paper duplex printer according to claim 1, wherein during single sided printing relative to the continuous paper:

the printing engine performs image formation based on the image data for the odd-numbered page in parallel with a blank paper output, and then, performs image formation based on the image data for the even-numbered page in parallel with a blank paper output, and a set of the image formation based on the image data for the odd-numbered page and the blank paper output and another set of the image formation based on the image data for the even-numbered page and the blank paper output are alternately repeated.

3. The continuous paper duplex printer according to claim 1, further comprising a storage section, wherein the printer controller makes the image data per page that is converted from the print data be stored in the storage section, during single sided printing for reprinting, the front surface image processing apparatus reads out the image data for an odd-numbered page from the storage section to perform the image processing, during the single sided printing for reprinting, the back surface image processing apparatus reads out the image data for an even-numbered page from the storage section to perform the image processing in parallel with the image processing of the image data for the odd-numbered page performed by the front surface image processing apparatus, during the single sided printing for reprinting relative to the continuous paper, the printing engine performs image formation based on the image data for the odd-numbered page in parallel with image formation of the even-numbered page, and then, a blank paper output for the odd-numbered page and a blank paper output for the even-numbered page are parallelly performed, and the image formation based on the image data for the odd-numbered page and for the even-numbered page and the blank paper outputs are alternately repeated.

4. The continuous paper duplex printer according to claim 1, wherein during single sided printing, the back surface image processing apparatus performs image processing for rotating image data 180 degrees.

5. The continuous paper duplex printer according to claim 1, wherein the printer controller is connected to the front surface image processing apparatus and the back surface image processing apparatus via a multiplex data transfer path capable of parallelly transferring image data.

6. The continuous paper duplex printer according to claim 5, wherein the multiplex data transfer path is a transfer path based on PCI Express.

7. The continuous paper duplex printer according to claim 1, further comprising a feed path that feeds the continuous paper in a reversed state to the printing engine after the printing engine prints the front surface, wherein the printing engine performs image formation on the front surface of the continuous paper having a paper width of substantially a half of an image formable width of the printing engine at substantially a half width of the image formable width, and the printing engine performs image formation on the back surface of the continuous paper that is reversed and fed after the front surface having been printed via the feed path at substantially another half width of the image formable width to perform the image formation on the back surface of the continuous paper in parallel with the image formation on the front surface at same position in a feed direction.

8. A printing method performed by a continuous paper duplex printer, the printing method comprising:

performing image processing of image data for printing on a front surface of continuous paper by a front surface image processing apparatus;

performing image processing of image data for printing on a back surface of the continuous paper by a back surface image processing apparatus;

converting print data into image data per page, during duplex printing, transmitting image data for an odd-numbered page to the front surface image processing apparatus, and transmitting image data for an even-numbered page to the back surface image processing apparatus, by a printer controller;

forming an image for an odd-numbered page on a front of the continuous paper and forming an image for an even-numbered page different from an even-numbered page subsequent to the odd-numbered page being in printing on a back of the continuous paper in parallel with image formation of the image data for an odd-numbered page by a printing engine based on the image data subjected to the image processing performed by the front surface image processing apparatus and the image data subjected to the image processing performed by the back surface image processing apparatus; and transmitting blank page image data or a blank page instruction to the back surface image processing apparatus by the printer controller when the printer controller transmits the image data for an odd-numbered page to the front surface image processing apparatus, and transmitting blank page image data or a blank page instruction to the front surface image processing apparatus by the printer controller when the printer controller transmits the image data for an even-numbered page to the back surface image processing apparatus, during single sided printing.

* * * * *